(12) United States Patent
Anderson et al.

(10) Patent No.: US 7,328,563 B1
(45) Date of Patent: Feb. 12, 2008

(54) WALK REEL MOWER WITH ELECTRIC REEL AND TRACTION DRIVES

(75) Inventors: Mark S. Anderson, Prior Lake, MN (US); Jackie R. Gust, Northfield, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 11/478,264

(22) Filed: Jun. 29, 2006

Related U.S. Application Data

(62) Division of application No. 10/683,175, filed on Oct. 10, 2003, now Pat. No. 7,111,443.

(60) Provisional application No. 60/417,965, filed on Oct. 11, 2002.

(51) Int. Cl.
*A01D 69/00* (2006.01)
(52) U.S. Cl. ........................ 56/11.9; 180/65.1
(58) Field of Classification Search ............... 180/65.1, 180/68.5, 200; 320/107, 104, 105, 106, 124, 320/122; 56/11.9, 7, 10.2 G
See application file for complete search history.

(56) References Cited

U.S. PATENT DOCUMENTS

| | | | |
|---|---|---|---|
| 1,514,056 A | | 11/1924 | Leitzen |
| 3,581,480 A | * | 6/1971 | O'Connor et al. ........... 56/11.9 |
| 3,732,671 A | * | 5/1973 | Allen et al. ............... 56/10.2 R |
| 3,841,069 A | * | 10/1974 | Weck ......................... 56/10.5 |
| 3,989,544 A | | 11/1976 | Santo |
| 4,042,054 A | * | 8/1977 | Ward ........................... 180/60 |
| 4,277,737 A | * | 7/1981 | Muller-Werth .............. 320/127 |
| 4,435,486 A | | 3/1984 | Pomaro et al. |
| 4,756,978 A | | 7/1988 | Nitcher et al. |
| 4,995,227 A | * | 2/1991 | Foster ......................... 56/249 |
| 5,049,802 A | * | 9/1991 | Mintus et al. .............. 320/107 |
| 5,360,307 A | * | 11/1994 | Schemm et al. ............ 414/343 |
| 5,402,626 A | | 4/1995 | Zinck |
| 5,540,037 A | * | 7/1996 | Lamb et al. ..................... 56/7 |
| 5,559,420 A | * | 9/1996 | Kohchi ....................... 180/68.5 |
| 5,606,851 A | | 3/1997 | Bruener et al. |

(Continued)

FOREIGN PATENT DOCUMENTS

GB 985287 3/1965

(Continued)

*Primary Examiner*—Árpád Fábián Kovács
(74) *Attorney, Agent, or Firm*—James W. Miller

(57) ABSTRACT

A walk reel mower has a front mounted reel cutting unit and a rear handle. The operator pushes the handle towards the ground to lift the reel cutting unit off the ground prior to turning the walk reel mower around. When this occurs, the manner in which the reel cutting unit is supported in conjunction with the influence of gravity causes the reel cutting unit to pitch rearwardly relative to the frame of the walk reel mower. This change of orientation is used to close a switch which, in turn, initiates an automatic slow down of the mower to ease the task of turning the mower around. When a turn is completed and the cutting unit is dropped back down into engagement with the ground, the slow down is terminated and the ground speed resumes at whatever predetermined ground speed was previously selected by the operator.

5 Claims, 9 Drawing Sheets

U.S. PATENT DOCUMENTS

| | | | |
|---|---|---|---|
| 5,727,372 A * | 3/1998 | Kanitz et al. ................. | 56/11.9 |
| 5,894,715 A | 4/1999 | Braun et al. | |
| 5,983,612 A * | 11/1999 | Bauswell et al. ............ | 56/11.9 |
| 6,082,084 A * | 7/2000 | Reimers et al. .............. | 56/11.9 |
| 6,523,334 B1 | 2/2003 | Dettmann | |
| 6,571,542 B1 * | 6/2003 | Fillman et al. .............. | 56/10.6 |
| 7,007,446 B2 | 3/2006 | Dettmann | |
| 2007/0051542 A1 * | 3/2007 | Wilks ........................ | 180/65.1 |

FOREIGN PATENT DOCUMENTS

| | | |
|---|---|---|
| GB | 1157626 | 7/1969 |

* cited by examiner

WALK REEL MOWER WITH ELECTRIC REEL AND TRACTION DRIVES

CROSS REFERENCE TO RELATED APPLICATIONS

This application is a division of application Ser. No. 10/683,175, filed Oct. 10, 2003 now U.S. Pat. No. 7,111,443, which claims the benefit of one or more previously filed provisional applications identified as follows: Application Ser. No. 60/417,965 filed Oct. 11, 2002 now abandoned.

TECHNICAL FIELD

This invention relates to a walk reel mower, such as a walk greensmower for cutting the greens on golf courses. More particularly, this invention relates to a walk reel mower having electric traction and reel drives. In addition, this invention relates to a walk reel mower having a system that automatically slows the mower during a turn.

BACKGROUND OF THE INVENTION

Walk reel mowers are known for precision cutting of grass and the like, such as the grass found on golf greens. Such reel mowers have a frame which carries a front mounted reel cutting unit. A rear handle extends upwardly from the frame to allow an operator to walk behind the mower to guide and operate the mower. The handle includes various controls for allowing the operator to selectively engage and disengage the traction and reel drives of the mower.

Electrically powered walk reel mowers are known. British Patent 985,287 to Southall discloses such a mower having two electric motors. One motor powers the traction drive and the other motor powers the reel drive. The mower carries a battery for providing electric power to the electric motors. Access can be had to the battery through a removable panel.

One problem with known electric walk reel mowers is their limited range. It is desirable that such mowers be able to cut at least three or four average sized golf greens with one fully charged battery. However, this is not typically possible with common battery and motor combinations. Usually, only one or two golf course greens can be adequately cut with one fully charged battery.

Accordingly, it is necessary to carry additional fully charged replacement batteries and to periodically swap or exchange a new, fully charged battery for a depleted battery on the mower. This is a relatively cumbersome and time consuming process for known electric walk reel mowers, requiring that one battery be disconnected and removed while the new battery is placed and reconnected. This entails some time and effort. In addition, it requires that a supply of replacement batteries be carried and be on hand with such batteries being easy to recharge. Again, this requirement is not met by existing electric mowers. As a result, electrically driven walk reel mowers have not been nearly as commercially successful as their counterparts powered by internal combustion engines.

Apart from how a walk reel mower is powered, whether such power be from an electrical motor or internal combustion engine, such mowers can be relatively tricky to operate particularly for an unskilled operator. When mowing a golf green or the like, the operator drives the mower across the green at some predetermined ground speed. This ground speed is often the highest speed provided by the traction drive so that the operator can minimize the amount of time it takes to cut the green. As the operator approaches the boundary of the green after making a cutting pass across the green, the operator must turn the mower around to come back across the green in the opposite direction in another cutting pass.

In turning a walk reel mower around, the operator typically initiates the turn just as the mower reaches the boundary of the green. First, the operator pushes down on the handle of the mower to lift the reel cutting unit carried on the front of the mower off the ground so that the apron of the green is not cut. With the cutting unit held up off the ground by keeping the handle depressed, the operator then swings or turns the mower around by manipulating the handle as the traction drive continues to propel the mower over the ground. Once the mower is turned around to face back in the direction from whence it just came, the operator can then approach the green to start a new cutting pass. As the mower reaches the boundary of the green, the operator then lets up or stops pushing down on the handle to allow the cutting unit to drop back down into engagement with the ground to begin a new cutting pass.

While the procedure for turning a walk reel mower seems fairly straightforward, it requires the operator to speed up and more or less run to stay behind the handle as the mower swings around. This is due to the fact that the nominal ground speed of the mower stays constant and the operator has to move around a much longer path than the mower to stay behind the handle. While skilled and experienced operators learn to properly increase their walking speed during a turn, relatively unskilled or inexperienced operators find it difficult to do. Such operators can lose some control over the mower and often do not get the mower turned around as precisely as is needed for the next cutting pass. It would be desirable for walk reel mowers to be easier to turn.

SUMMARY OF THE INVENTION

It is one aspect of this invention to provide walk reel mower which comprises a frame which carries a front mounted reel cutting unit. The cutting unit comprises a rotatable reel cooperating with a bedknife, the cutting unit having at least a portion thereof engaging the ground while cutting. A handle extends upwardly and rearwardly from the frame to allow an operator to walk behind the mower to guide and operate the mower, the handle being arranged on the frame so that the operator is able to push down on the handle to lift the cutting unit upwardly off the ground. A traction drive is provided for propelling the frame over the ground. A slow down system is operatively connected to the traction drive for automatically slowing the traction drive, the slow down system being activated in response to the operator pushing down on the handle to lift the front mounted cutting unit upwardly off the ground.

Another aspect of this invention relates to a walk reel mower which comprises a frame which carries a reel cutting unit, the cutting unit comprising a rotatable reel cooperating with a bedknife. A handle extends upwardly and rearwardly from the frame to allow an operator to walk behind the mower to guide and operate the mower. An electrical traction drive propels the frame over the ground. At least one cradle is carried on the frame for releasably receiving a battery. The battery and cradle have mating plug in connectors such that the connectors automatically plug into one another to automatically connect the battery to the electrical traction drive of the mower as the battery is dropped into and seated within the cradle.

Yet another aspect of this invention relates to a walk reel mower and trailer which comprises an electrically driven walk reel mower, the walk reel mower being powered by at least one battery carried thereon. A trailer is configured to support and transport the walk reel mower. The trailer has at least one station for charging at least one replacement battery for use with the walk reel mower when the battery carried on the walk reel mower is depleted such that the at least one replacement battery is carried on the trailer to be readily accessible to the mower after the mower is offloaded from the trailer.

Another aspect of this invention relates to a walk reel mower which comprises a frame which carries a reel cutting unit, the cutting unit comprising a rotatable reel cooperating with a bedknife. A handle extends upwardly and rearwardly from the frame to allow an operator to walk behind the mower to guide and operate the mower. An electric motor rotates the reel relative to the bedknife. An ammeter is provided on the mower visually observable by an operator from behind the handle for indicating current draw in the electric motor as an indication of reel to bedknife adjustment.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
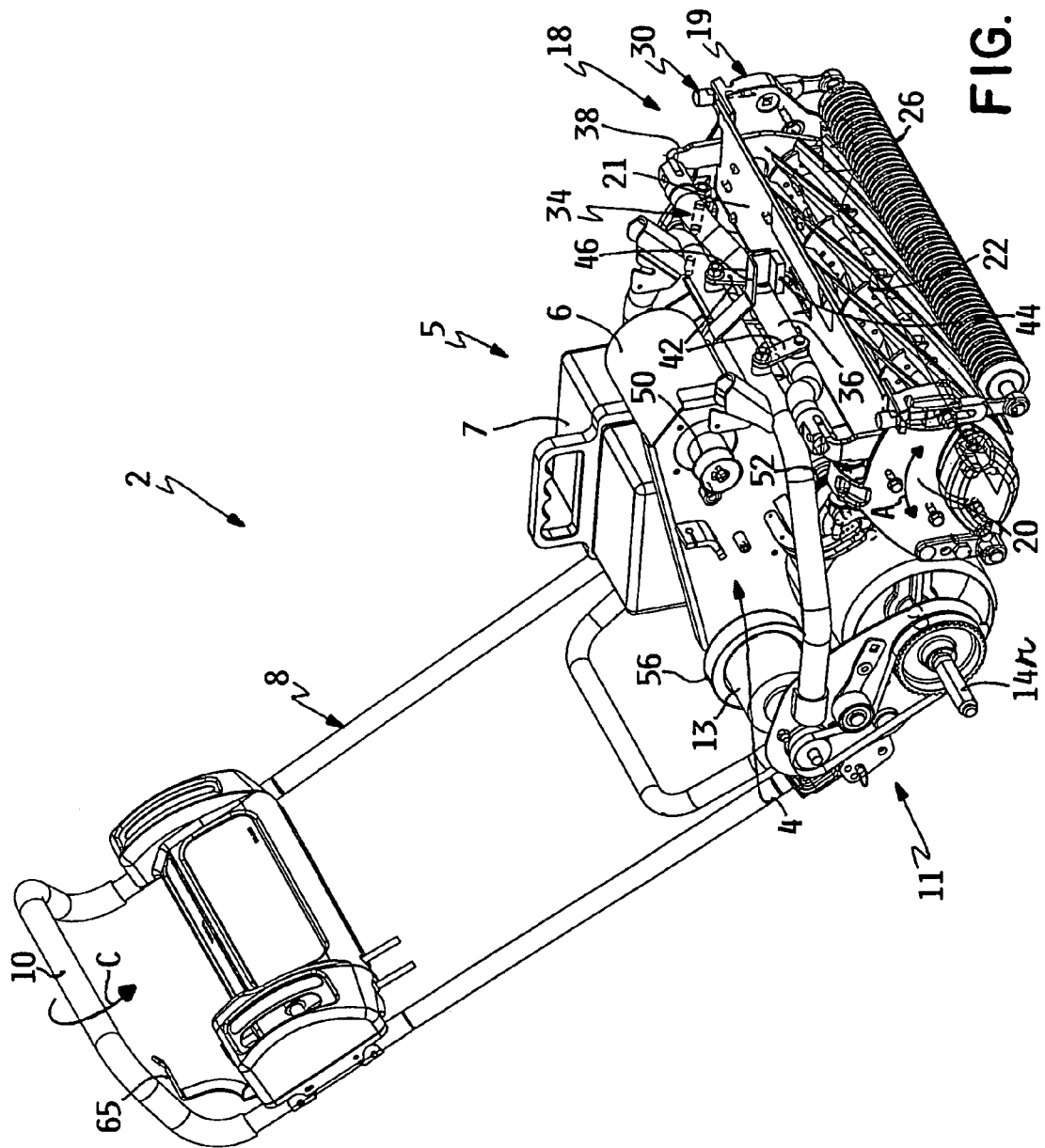
FIG. 1 is a perspective view of a walk reel mower according to this invention, particularly illustrating the mower from in front and from one side of the mower as well as illustrating a slow down switch located above the reel cutting unit and various portions of the traction and reel drives for the mower.

FIG. 1 illustrates a walk reel mower 2 having a reel cutting unit 18 for cutting grass. The term "walk reel mower" is used in this application to refer to a walk reel mower 2 in which the operator walks behind walk reel mower 2 as walk reel mower 2 is operated. The operator is not supported or carried by walk reel mower 2 as would be the case with a riding reel mower. More particularly, walk reel mower 2 is suited for mowing grass at low heights of cut where precision cutting is required, such as on the greens of a golf course. However, the various aspects of the invention disclosed herein are not limited for use on a walk reel mower for mowing only golf greens, but can be used on walk reel mowers for mowing other turf areas as well.

FIG. 1 provides an overall view of one embodiment of a walk reel mower 2 according to this invention. Walk reel mower 2 includes a frame 4 on which a prime mover 5 is carried. Prime mover 5 comprises an electric motor 6 driven by a rechargeable battery 7. Battery 7 is removably carried on frame 4 of mower 2. Motor 6 is electrically coupled to battery 7 to draw power from battery 7 when battery 7 is in place on frame 4.

Mower 2 includes a U-shaped, upwardly extending handle 8 connected at its lower end to frame 4 of mower 2. Handle 8 includes an upper cross bar 10 which the operator can grip to guide mower 2 during operation thereof. Various operational controls are provided on handle 8 for allowing the operator to control the operation of the traction and reel drives of mower 2.

Mower 2 is propelled across the ground by a traction drive 11 including a split traction drum 12 rotatably carried at the rear of frame 4. Traction drum 12 is split, as is conventional, into two halves, a left half 12*l* and a right half 12*r*. (See FIG. 6). Traction drum halves 12*l* and 12*r* are independently driven by a differential 13 to allow a difference in rotational speed between traction drum halves 12*l* and 12*r* when mower 2 is turning.

The rotational shaft 14*l* and 14*r* for each traction drum half 12*l* or 12*r* is extended outwardly to be able to mount a transport wheel (not shown) on each side of mower 2. The transport wheels are used only when mower 2 is being driven from one site to another. When mower 2 is being used to cut grass, transport wheels are removed so that mower 2 appears as shown in the drawings hereof. Mower 2 is then supported and driven solely by traction drum 12.

If desired, traction drum 12 could be replaced by separate left and right drive wheels engaging the ground in the manner of transport wheels. In this case, such drive wheels would not be removed and would support and propel mower 2 for movement over the ground even during cutting operations.

Figure 3:
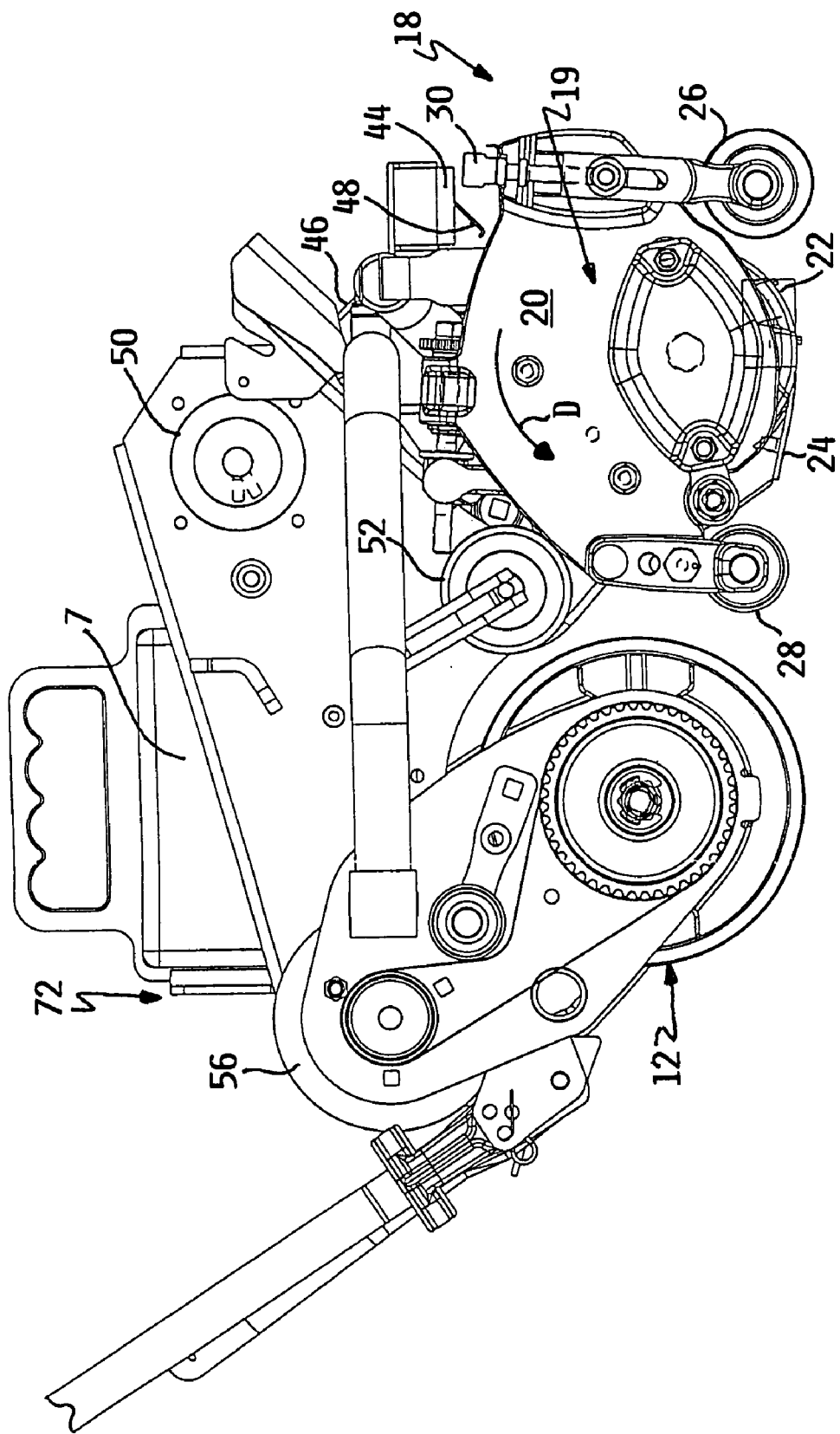
FIG. 3 is a side elevational view of the walk reel mower of FIG. 1, particularly illustrating the slow down switch in an unactuated state that occurs when the reel cutting unit is in engagement with the ground.
Figure 4:
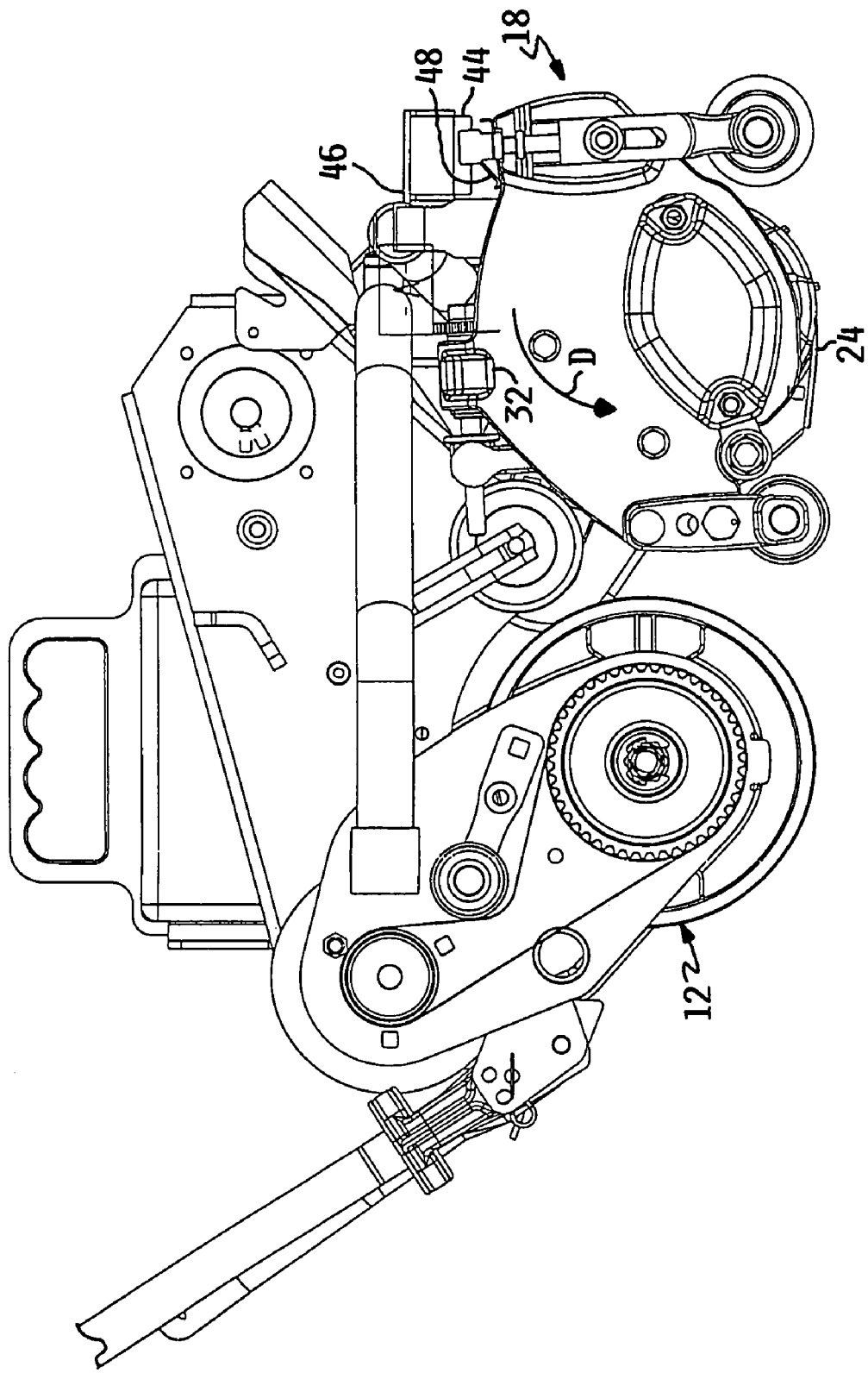
FIG. 4 is a side elevational view of the walk reel mower of FIG. 1, particularly illustrating the slow down switch in an actuated state that occurs when the reel cutting unit has been lifted off the ground.

A reel cutting unit 18 of generally conventional design is carried on the front of frame 4. Cutting unit 18 includes a cutting unit frame 19 comprising spaced side plates 20 connected to an arcuate back plate (not shown) and a top plate 21. A helically bladed cutting reel 22 is rotatably journalled between side plates 20 and is positioned in front of the back plate below top plate 21. As cutting reel 22 rotates, the reel blades sweep standing grass against a sharpened bedknife 24 to thereby sever the grass. Bedknife 24 extends between side plates 20 along the length of cutting reel 22. Bedknife 24 is shown in FIGS. 3 and 4.

Cutting unit 18 is self supporting for rolling over the ground or turf by front and rear rollers 26 and 28 extending between side plates 18. The height of cut can be adjusted in any conventional manner. For example, front roller 26 can be moved up and down relative to side plates 18 by a threaded height adjusting mechanism 30 carried on each side plate 20. In addition, bedknife 24 can be adjusted relative to cutting reel 22 by bedknife adjusters 32 carried on the top of cutting unit 18.

Figure 8:
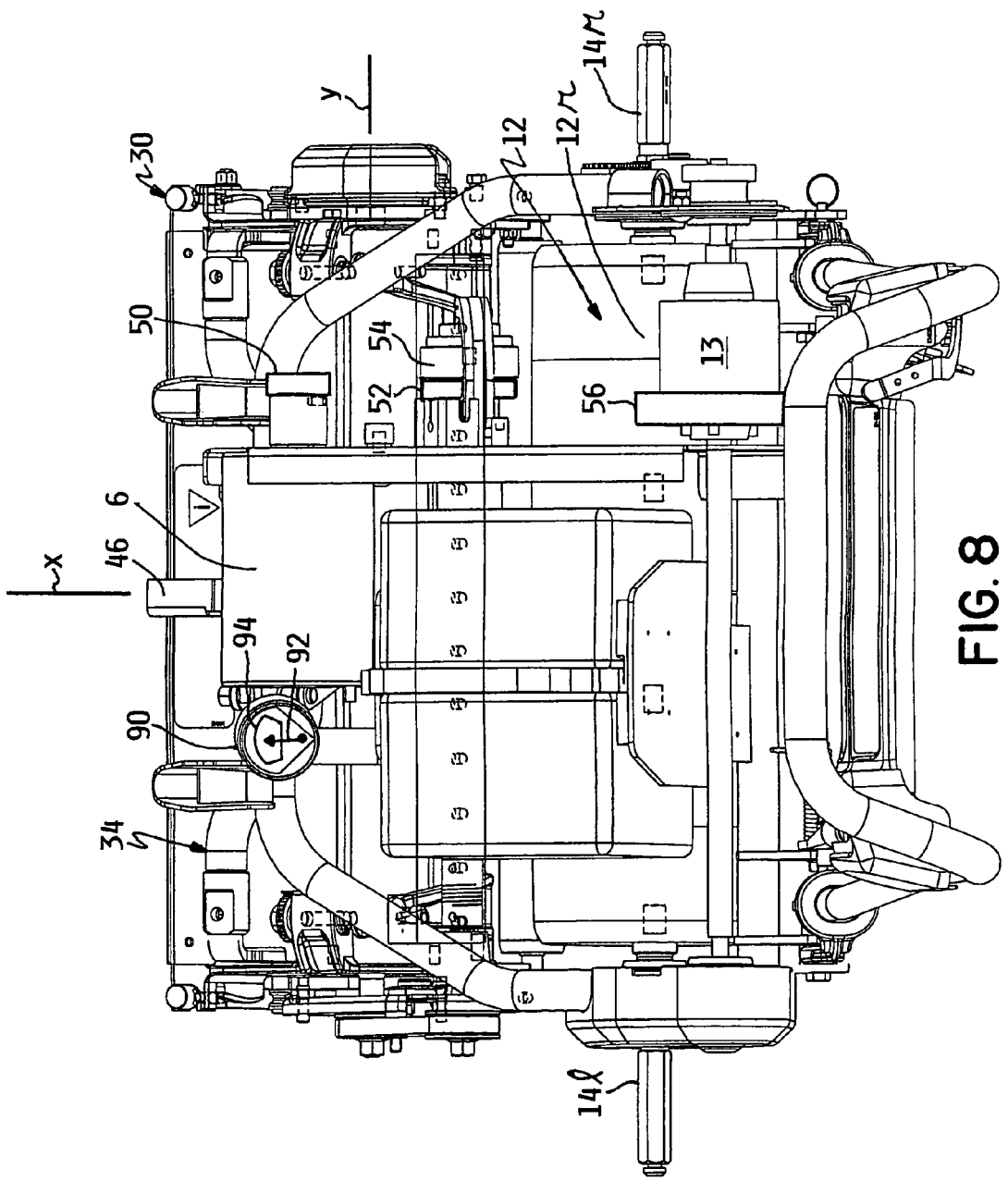
FIG. 8 is a top plan view of a portion of the walk reel mower shown in FIG. 1, particularly illustrating an ammeter on the mower for indicating current draw as an indication of reel to bedknife adjustment, such ammeter having been deleted from the other views for the purpose of clarity.

Cutting unit 18 is allowed to float or move relative to frame 4 about two axes. First, cutting unit 18 can roll about a longitudinal horizontal axis x which is coaxial with the longitudinal centerline of cutting unit 18. Second, cutting unit 18 can pitch about a transverse horizontal axis y which is coaxial with the axis of cutting reel 22. See FIG. 8 for a depiction of the x and y axes. Motion of cutting unit 18 about the axes x and y allows cutting unit 18 to better conform to the contours of the ground being cut to avoid scalping. This is particularly important when cutting golf greens, especially those found on newer golf courses in which the greens often have pronounced undulations.

Cutting unit 18 is supported in the above described manner by a generally U-shaped cutting unit carrier frame 34. Cutting unit carrier frame 34 includes a transverse cross member 36 having downwardly extending, vertical support arms 38 at either end thereof. Each vertical support arm 38 passes downwardly through a slot 39 in top wall 21 of cutting unit 18 to lie adjacent one side plate 20. The lower end of each vertical arm 38 includes an inwardly protruding circular hub (not shown) which rotatably engages or journals the shaft of cutting reel 22. Thus, during operation of mower 2, cutting unit 18 can pivot or rock back and forth in the direction of the arrows A in FIG. 1 by pivoting or rocking on the inwardly protruding hubs of vertical support arms 38.

Figure 2:
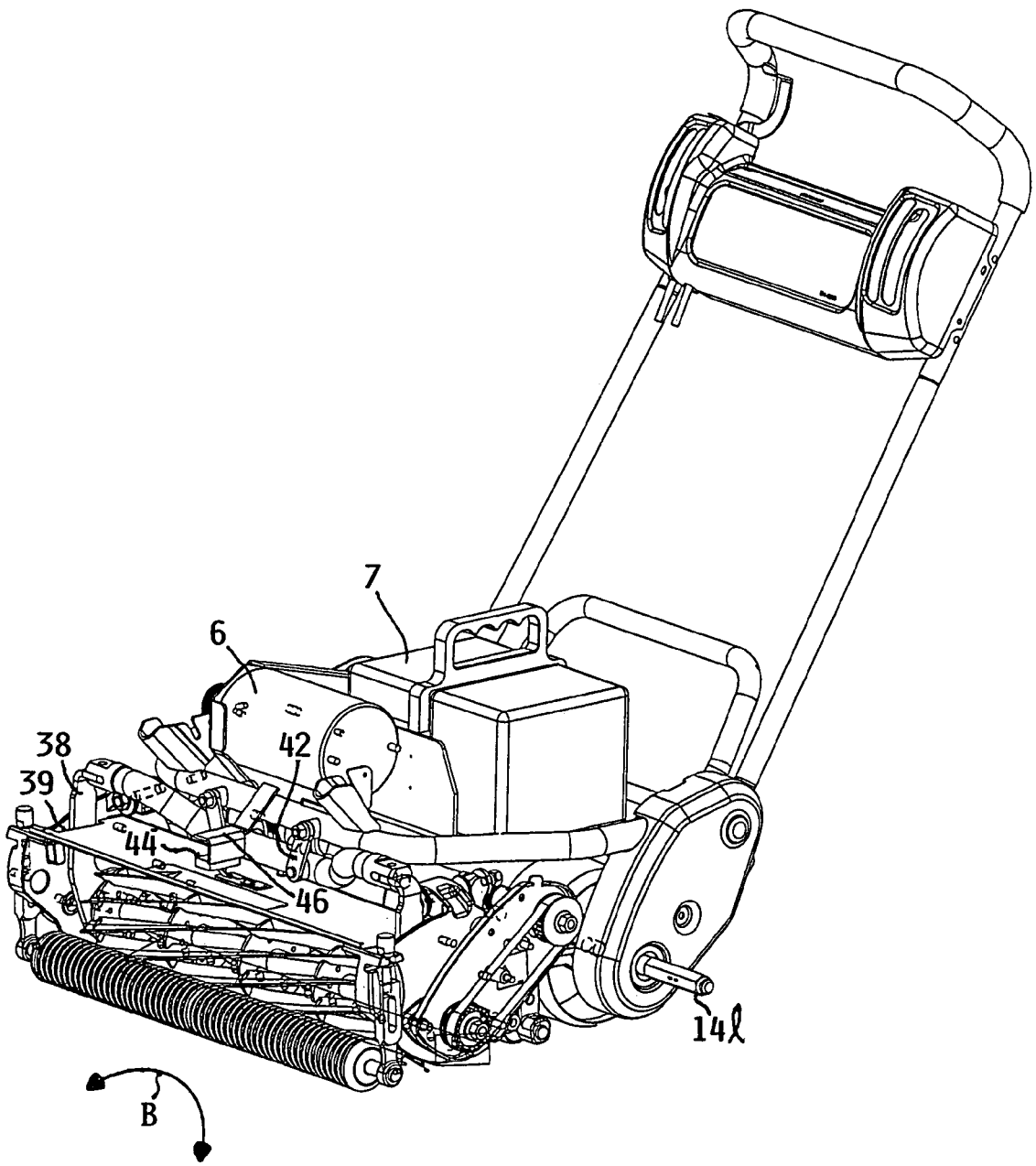
FIG. 2 is a perspective view of the walk reel mower of FIG. 1, particularly illustrating the mower from in front and from the side of the mower that is opposite to the side depicted in FIG. 1.

Cutting unit carrier frame 34 is further suspended from frame 4 by at least one pair of links 42. Referring to FIG. 1, the upper end of each link 42 is pivotally secured to frame 4 while the lower end of each link 42 is pivotally secured to cross member 36 of cutting unit carrier frame 34. Each link 42 is located offset from longitudinal axis x of cutting unit 18 so that links 42 are on opposite sides of longitudinal axis x, i.e. one link 42 is offset to the left of the axis x while the other link 42 is offset to the right of axis x. Links 42 permit the rolling motion depicted by the arrows B in FIG. 2.

Electric motor 6 has an output shaft that carries an output pulley 50. A drive belt (not shown) connects output pulley 50 to an input pulley 52 on a clutch 54 that is part of the reel drive. Input pulley 52 rotates continuously whenever electric motor 6 is running and output pulley 50 is spinning. The reel drive can be selectively started and stopped by activating or deactivating clutch 54. Another pulley (not shown) adjacent pulley 52 and rotatable with pulley 52 is connected by another drive belt (not shown) to an input pulley 56 of traction drive 11. Other ways of powering the traction and reel drives could be used.

When the operator initiates a turn of mower 2, the operator depresses or pushes down on handle 8, as depicted by the arrow C in FIG. 1, to raise the front of mower 2 to thereby lift cutting unit 18 off the ground. When this occurs, the weight distribution of cutting unit 18 will cause cutting unit 18 to pitch rearwardly relative to frame 4 in a counterclockwise direction about axis y. This is depicted by the arrow D in FIGS. 3 and 4. FIG. 3 depicts cutting unit 18 prior to this rearward pitching and FIG. 4 depicts cutting unit 18 after some degree of rearward pitching.

One aspect of this invention relates to a system for automatically slowing the mower during a turn. More particularly, the slow down system of this invention is actuated when the operator initiates a turn by depressing handle 8 to lift cutting unit 18 off the ground. This permits the operator to more easily stay behind handle 8 during a turn without having to run to keep up. After the turn is completed and the cutting unit 18 is lowered back into engagement with the ground, the system of this invention automatically terminates the speed reduction provided during the turn to permit the mower to resume travel at whatever operational ground speed had been predetermined by the operator.

The automatic slow down system of this aspect of the invention includes an electrical slow down switch 44. Switch 44 is mounted on frame 4 by a mounting bracket 46 in a position to overlie top plate 21 of cutting unit 18. Switch 44 includes an actuator arm 48 that changes the state of switch 44, i.e. closes switch 44, when actuator arm 48 is pushed upwardly towards the housing of the switch 44. FIG. 3 depicts switch 44 in an unactuated or open state with a gap or clearance existing between top wall 21 of cutting unit 18 and actuator arm 48. FIG. 4 depicts switch 44 in the act of closing into an actuated or closed state with the top wall 21 of cutting unit 18 having just engaged actuator arm 48.

The movement of cutting unit 18 that permits the closing of switch 44 is simply the natural pitching motion of cutting unit 18 in the direction of arrow D that occurs when cutting unit 18 is off the ground after the operator pushes down on handle 18 to begin turning mower 2 around. This pitching motion causes the portion of top wall 21 beneath switch 44 to lift upwardly until that portion of top wall 21 engages actuator arm 48 and lifts actuator arm 48 up towards the housing of switch 44 to close switch 48. Thus, switch 48 is responsive to the change of orientation that occurs between cutting unit 18 and frame 4 when cutting unit 18 is lifted off the ground by depressing handle 8. Accordingly, switch 48 is ultimately responsive to the operator's act of depressing handle 8, which is usually the first step in turning mower 2 around.

Figure 7:
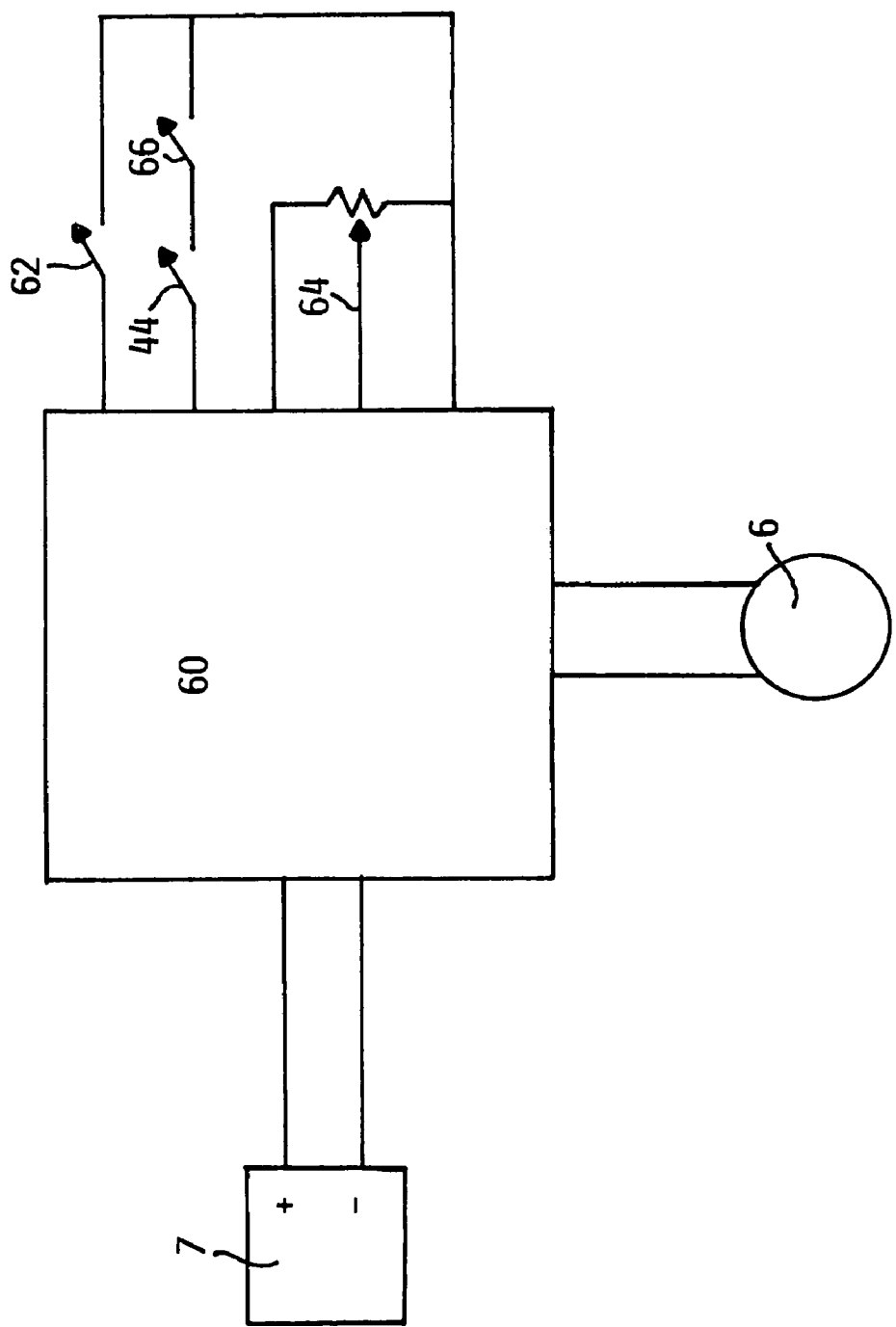
FIG. 7 is a schematic circuit diagram of the control system for operating the electric motor of the walk reel mower of FIG. 1.

Referring now to FIG. 7, a motor controller 60 is operatively connected between battery 7 and motor 6 to control the application of electrical power to motor 6. An on-off switch 62 can be selectively thrown by the operator to energize the electrical system of mower 2 and to begin rotation of electric motor 6. A variable rheostat 64 or the like, which is linked to a movable throttle 65 on handle 8 which throttle can be selectively moved by the operator, establishes a particular ground speed for the mower 2 by powering motor 6 from battery 7 at a variable speed setting established by the setting of throttle 65. Different operators can use throttle 65 to pick different ground speeds. Some operators may use a maximum speed setting as the normal operational setting for mower 2 while other operators may prefer some slower speed setting as the normal operational setting. Regardless, once throttle 65 is set to pick a power setting, it provides a particular predetermined ground speed for mower 2'.

Switch 44 is operatively coupled to motor controller 60 so that motor controller 60 detects the closing of switch 44. As noted above, this switch closing occurs when cutting unit 18 is lifted off the ground by an operator who has pushed down on handle 8 prior to beginning a turn. In any event, when motor controller 60 detects the closing of switch 44, motor controller 60 is designed or programmed to automatically decrease the power flowing from battery 7 to motor 6 by some predetermined increment. For example, motor controller 60 could be programmed to provide a 50% decrease, though the amount of the decrease could obviously be varied. In the case of a 50% decrease and assuming a setting of throttle 65 that would normally provide a 2 mph ground speed, motor controller 60 will automatically reduce the ground speed to 1 mph once it detects the closing of switch 44.

The effect of this speed reduction is to make it easier for the operator to remain behind handle 8 as the operator swings mower 2 around in a turn. The operator won't have to speed up or run to stay behind handle 8 since mower 2 will automatically slow prior to the beginning of the turn. Once the turn is completed and the operator lets up on handle 8 to lower the front of mower 2 and allow cutting unit 18 to reengage the ground, switch 44 will open when top wall 21 disengages switch actuator arm 48. Motor controller 60 will then terminate the programmed speed reduction to allow the ground speed of mower 2 to revert to the speed selected by the operator through the setting of throttle 65. Accordingly, a relatively unskilled or inexperienced operator will find it easier to turn mower 2 due to the automatic speed reduction provided by the slow down system of this invention.

In certain circumstances, the automatic speed reduction provided by this invention may not be desirable. For example, a skilled or experienced operator many not want or need for mower 2 to slow down during a turn. Accordingly, a normally closed override switch 66 is provided on handle 8 for selective operation by the operator. The operator can selectively open override switch 66 to selectively turn off or disable the automatic speed reduction during a turn. If this is done, mower 2 will not automatically slow during a turn. While it is preferred that an override switch 66 be included as part of the slow down system of this invention, such an override switch 66 could be deleted in which case the automatic slow down feature would be activated during every turn of mower 2.

In addition, while the slow down system of this invention has been shown in a mower 2 driven by an electric motor 6, this particular type of traction drive is not essential to this aspect of this invention. Mower 2 could be driven by a hydraulic motor, rather than an electric motor, with the hydraulic motor receiving hydraulic fluid from a pump driven by an internal combustion engine on walk frame 4. The closing of switch 44 could be sensed and used to open a valve or otherwise divert part of the hydraulic fluid flowing from the pump to the hydraulic motor to effect the same type of automatic speed reduction. Alternatively, the closing of switch 44 could be sensed and used to decrease the output of the pump to also effect the automatic speed reduction. Thus, the automatic slow down feature described herein is not limited for use with electrically driven walk reel mowers 2.

Moreover, the slow down system of this invention need not use a switch acting on or through a controller to provide the speed reduction. Mechanical systems would also be possible. For example, the rearward pitching of cutting unit 18 could act on a mechanical linkage connected to throttle 65. When cutting unit 18 pitches rearwardly after being lifted off the ground, the cutting unit 18 could then push or pull on the mechanical linkage to mechanically retard throttle 65 of a mower 2 driven by an internal combustion engine or by any other prime mover.

Alternatively, instead of connecting the mechanical linkage to the cutting unit, a pendulum could be pivotally mounted on a bracket on the internal combustion engine or prime mover or on the frame of the mower so as to swing as the operator pushes down on the handle to lift the cutting unit off the ground. The mechanical linkage would be attached at one end to the pendulum at some distance from the pivot so as to have some mechanical advantage. The other end of the mechanical linkage would be attached to the throttle. A small dashpot or dampener could be attached to the pendulum to reduce free swinging of the pendulum to avoid engine surging.

In any event, whether the mechanical linkage is connected to the cutting unit or to the pendulum, as throttle 65 is retarded by movement of the mechanical linkage and the engine or prime mover slows, the ground speed provided by the traction drive will slow as well. When cutting unit 18 is thereafter dropped back down into engagement with the ground after a turn, the mechanical linkage will return to its normal position in which throttle 65 has not been retarded to thereby discontinue the speed reduction provided during the turn. Spring biasing could be used to assist the mechanical linkage in returning to its normal position.

Desirably, even in this type of mechanical system, a lockout or override could be used to disable operation of the slow down system if so desired.

Obviously, the amount of pitching of cutting unit 18 that is sufficient to engage switch 44, or to engage the mechanical linkage just described, is greater than the amount of pitching about the y axis that takes place during a mowing operation. It is not desired that the slow down system be actuated every time cutting unit 18 pitches about the y axis as it follow ground contours during cutting. The slow down system is instead actuated only during a turn by the relatively greater amount or degree of pitching in the direction of arrow D that occurs when cutting unit 18 is off the ground.

Figure 9:
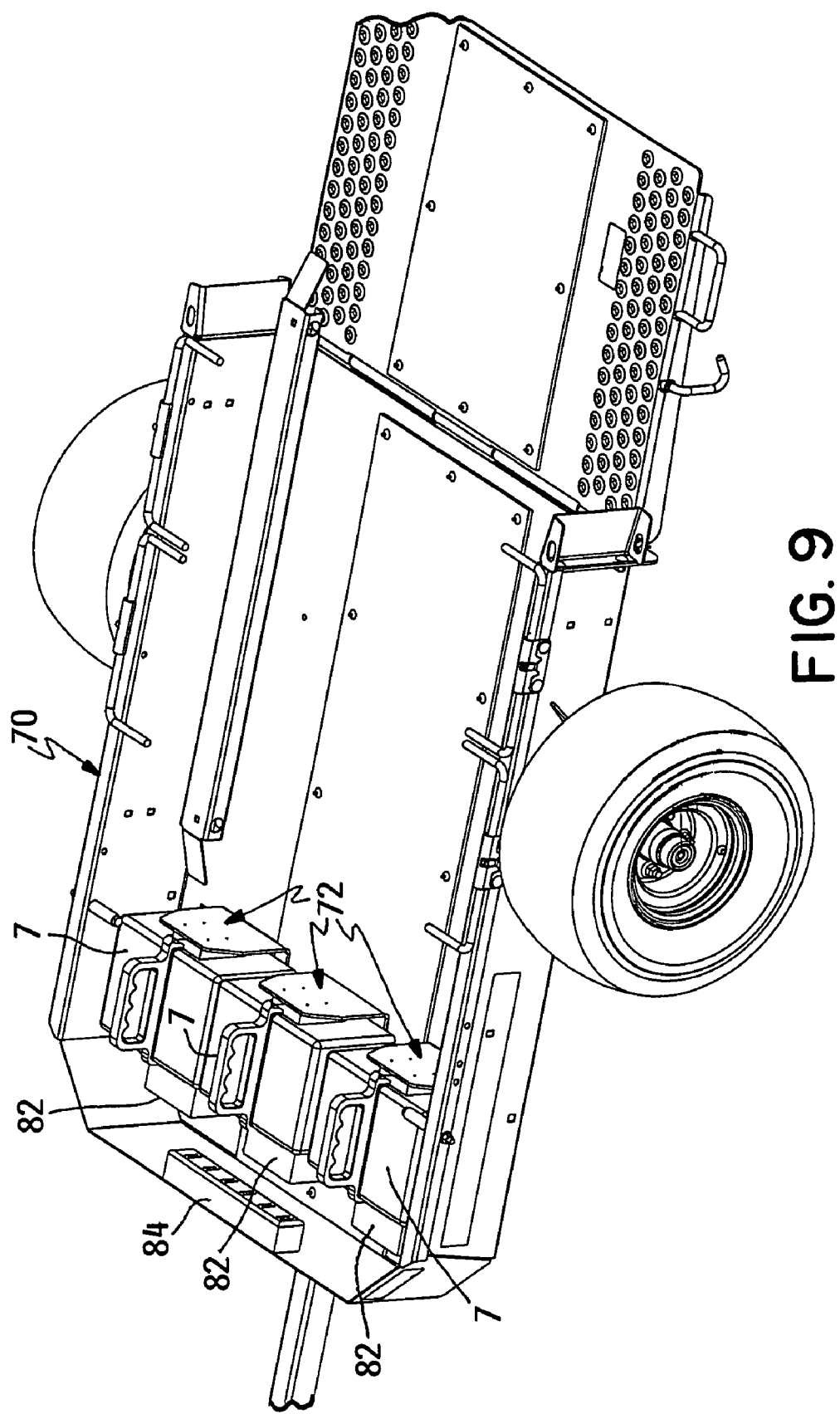
FIG. 9 is a perspective view of a trailer for carrying the walk reel mower of FIG. 1 and for charging and carrying a plurality of replacement batteries.

Another aspect of this invention relates solely to electrically driven walk reel mowers. This aspect of the invention relates to an easily replaceable and exchangeable battery 7 for permitting the range of mower 2 to be extended by replacing a spent or drained battery 7 with a fully charged battery 7. A supply of fully charged replacement batteries 7 can be conveniently carried on a charging and transport trailer 70, shown in FIG. 9.

Mower 2 includes a cradle 72 for releasably receiving battery 7. Battery 7 and cradle 72 have plug in connectors (not shown) such that battery 7 automatically connects to the electrical system of mower 2 when it is dropped into and seated within cradle 72. Similarly, battery 7 automatically disconnects when battery 7 is lifted out of cradle 72. Both cradle 72 and battery 7 will each have a mating connector thereon.

The Applicants have found that the SB50 connectors manufactured and sold by Anderson Power Products have sufficient durability and strength to withstand the many cycles in which batteries 7 will be dropped into or pulled out of cradle 72 over the life of mower 2. Such connectors are two pole power connectors with genderless housings such that one connector would be carried on battery 7 while another connector would be carried on or in cradle 72 or some adjacent portion of mower frame 4. The connector for cradle 72 would obviously be wired into the electrical system of mower 2. Such connectors are also shown in U.S. Pat. No. 3,909,099, which is incorporated by reference herein. Connectors of this type make it quick and easy to install and remove battery 7 from cradle 72.

Figure 5:
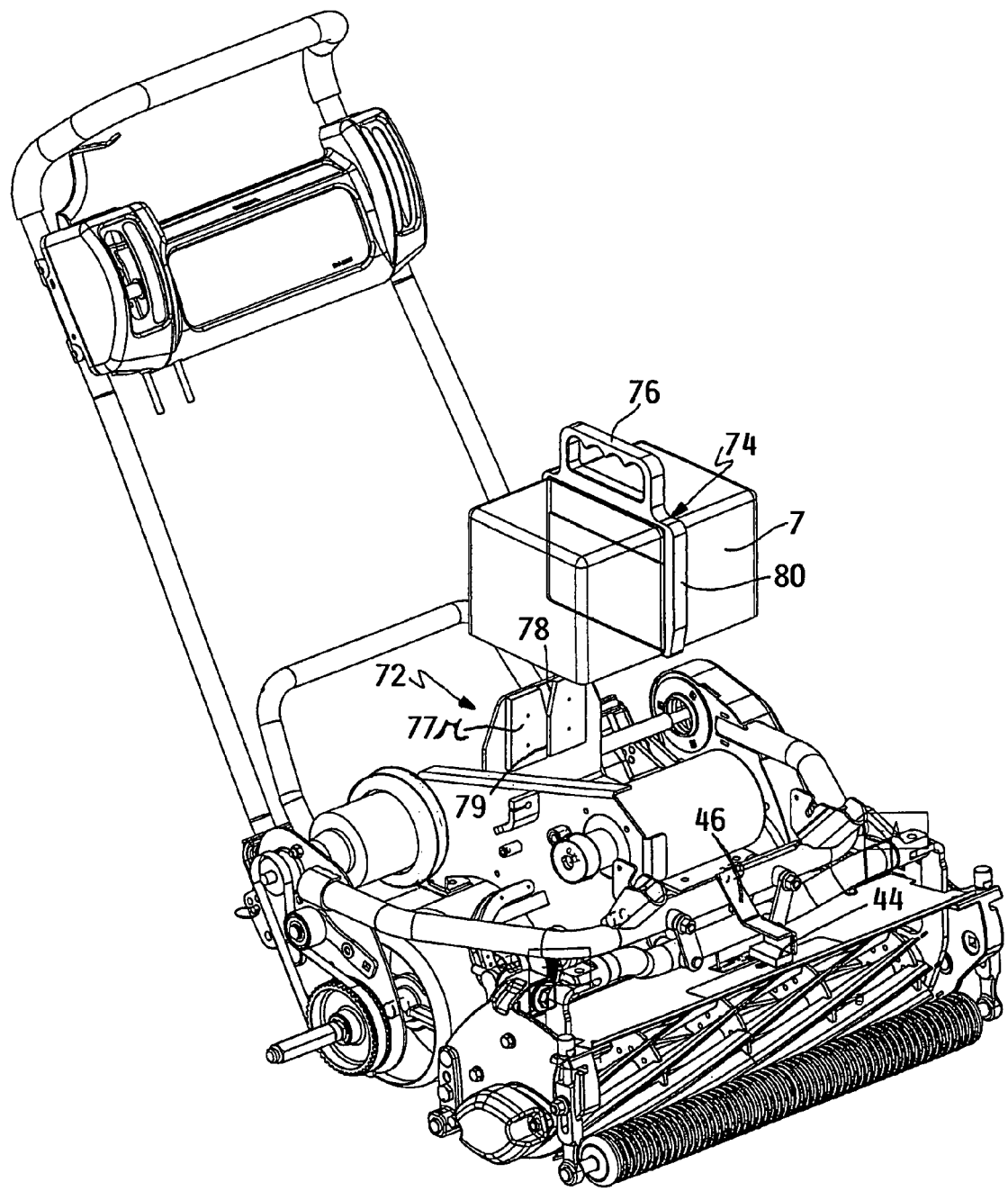
FIG. 5 is a perspective view of the walk reel mower of FIG. 1, particularly illustrating the battery lifted out of the mower and showing the rear guide for guiding the battery into place on the mower.
Figure 6:
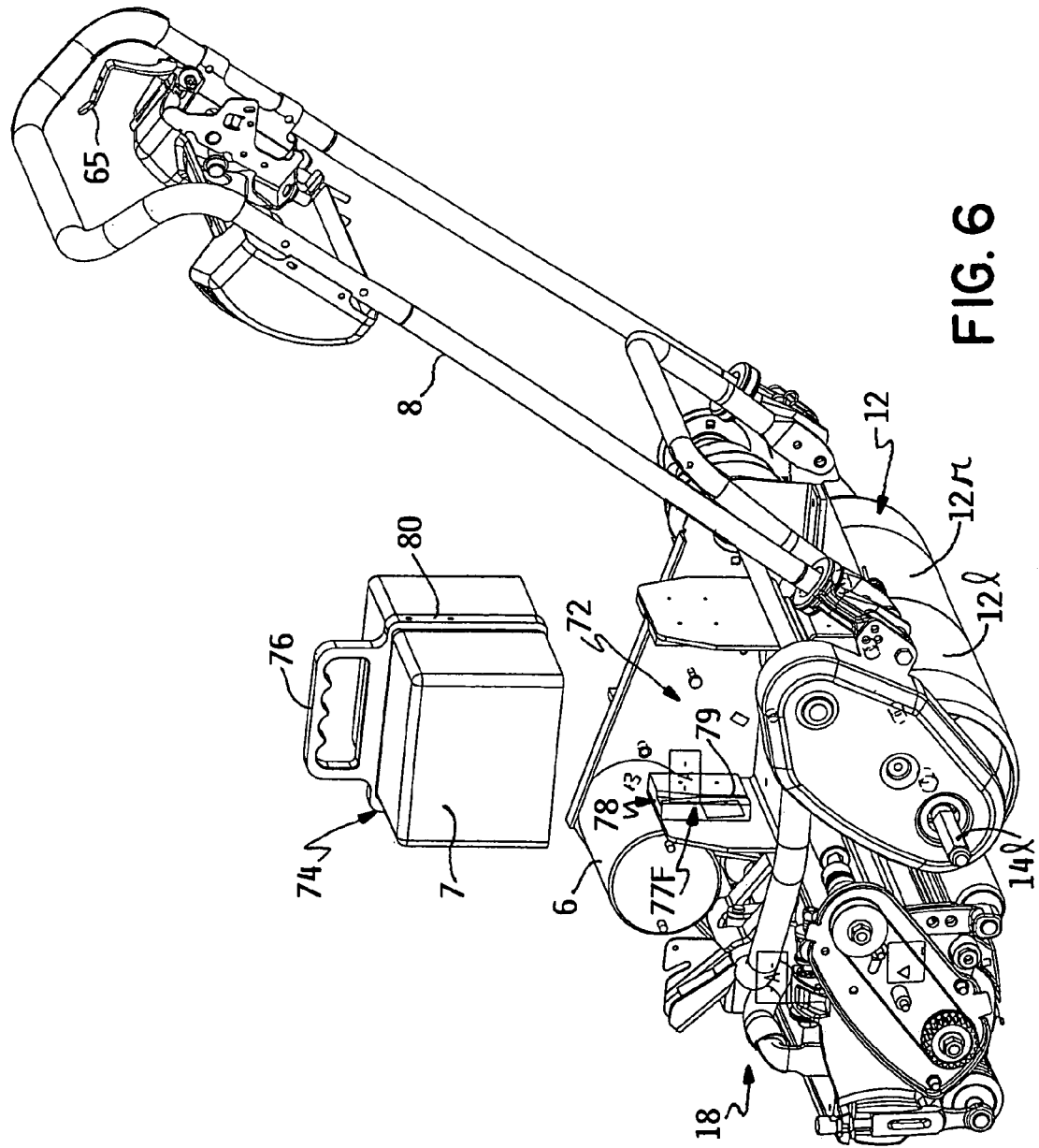
FIG. 6 is a perspective view of the walk reel mower of FIG. 1, particularly illustrating the battery lifted out of the mower and showing the front guide for guiding the battery into place on the mower.

Battery 7 includes a strap 74 encircling battery 7. Strap 74 has a top handle 76 for allowing the operator to pick up and carry battery 7. Cradle 72 is provided with front and rear notched or slotted guides 77 having a V-shaped entrance 78 leading to a vertical lower portion 79. Front guide 77*f* is shown in FIG. 6 and rear guide 77*r* is shown in FIG. 5. Vertical rail portions 80 of strap 74 on the front and rear sides of battery 7 will slide down into the slotted guides 77 to guide battery 7 into place and help hold battery 7 within cradle 72. The V-shaped entrances 78 to guides 77 help correct misalignment as the operator drops battery 7 down into cradle 72 as such entrances 78 will capture the vertical rail portions 80 of strap 74 and help guide them into alignment with the vertical lower portions 79 of guides 77. Proper alignment ensures the electrical connectors are aligned so that such connectors will properly plug into one another.

Trailer 70 is a conventional flatbed trailer of the type used for transporting mower 2. Trailer 70 includes a plurality of cradles 72 at one end which cradles 72 are similar to cradle 72 on mower 2, namely each cradle 72 on trailer 70 will be provided with front and rear guides 77 and connectors (not shown) that plug or snap into the connectors provided on batteries 7. Each cradle 72 has a charger 82 that can be plugged into an outlet strip 84 on trailer 70. When outlet strip 84 is plugged into an electrical outlet, and when chargers 82 are plugged into outlet strip 84, batteries 7 contained in cradles 62 will be recharged.

Since trailer 70 is often in close proximity to mower 2 during use of mower 2 having been used to transport mower 2, a ready supply of fully charged replacement batteries 7 can be maintained in the cradles 62 on trailer 70. When the battery 7 on mower 2 runs down, the operator need only lift up and pull the spent battery 7 out of cradle 72 on mower 2, disconnecting the plug in connectors simply by pulling battery 7 out of cradle 72. The operator can then pull a fully charged battery 7 out of one of the cradles 62 on trailer 70 and then drop this fully charged battery 7 into cradle 72 on mower 2 to be able to continue mowing. Thus, a trailer 70 carrying two or three additional batteries 7 would be sufficient to have enough batteries for completing most mowing jobs of the type and length for which a walk reel mower 2 of the type shown herein would be used. Batteries 7 can be recharged in trailer 70 wherever a source of electrical power can be found into which outlet strip 84 can be plugged, i.e. either in a garage or shop in which trailer 70 might be stored or on the job site if a source of electrical power is nearby.

Referring now to FIG. 7, an electrical meter 90, such as an ammeter, can be mounted on walk frame 4 or on cutting unit 18. Meter 90 would be mounted to be easily visible to the operator. Meter 90 would have an indicator 92, such as a pointer, that could be read against a scale 94, as an indication of the power being drawn by motor 6 during operation of cutting reel 22. Such an indication of power draw is directly related to the amount of interference between the blades of cutting reel 22 and bedknife 24. When bedknife 24 is too tightly adjusted, the current draw shown on meter 90 will be excessively high. Thus, the operator can use meter 90 and adjust the position of bedknife 24 until the power draw indicated on meter 90 is in a range indicating proper reel to bedknife clearance.

Various modifications of this invention will be apparent to those skilled in the art. Accordingly, this invention will be limited only by the appended claims.

We claim:

1. A walk reel mower and trailer, which comprises:
   (a) an electrically driven walk reel mower, the walk reel mower being powered by at least one battery carried thereon, wherein the battery has a weight that is sufficiently low to permit the battery to be manually lifted and lowered by an operator into and out of the walk reel mower for manual installation and removal of the battery from the walk reel mower, the battery having a lifting handle or strap to facilitate the manual lifting and lowering of the battery by the operator;
   (b) a trailer configured to support and transport the walk reel mower to a job site, the trailer also being configured to support and transport a plurality of replacement batteries thereon in addition to supporting and transporting the walk reel mower, wherein the trailer has at least one station for charging the replacement batteries, wherein the replacement batteries on the trailer and the battery on the walk reel mower are substantially identical to one another with each replacement battery being individually removable and replaceable on the trailer separately from the other replacement batteries by individually lifting and lowering each replacement battery into and out of the trailer using the lifting handle or strap thereon in the same manner that the battery on the walk reel mower is lifted and lowered into and out of the walk reel mower using the lifting handle and strap thereon, and wherein a drained or depleted battery carried on the walk reel mower can be individually replaced with a fully charged replacement battery from the trailer with the replacement batteries being available to the operator at the job site by virtue of being carried on the trailer used to transport the walk reel mower to the job site.

2. The walk reel mower and trailer of claim 1, wherein the trailer includes a plurality of charging stations for individually charging the plurality of replacement batteries, wherein one replacement battery is received in one charging station.

3. The walk reel mower and trailer of claim 1, wherein each charging station includes a separate charger for charging one of the replacement batteries.

4. The walk reel mower and trailer of claim 3, wherein the trailer includes an outlet strip that may be selectively connected to a source of electrical power with the outlet strip having a plurality of electrical outlets, and wherein the chargers are plugged into individual electrical outlets on the outlet strip.

5. The walk reel mower and trailer of claim 4, wherein the outlet strip is located on a front wall of the trailer, and wherein the charging stations are arranged side-by-side across a width of the trailer adjacent the front wall of the trailer and in front of a more rearward storage position of the walk reel mower on the trailer.

* * * * *